United States Patent [19]

Jonas et al.

[11] Patent Number: 5,041,518

[45] Date of Patent: Aug. 20, 1991

[54] PROCESS FOR THE PRODUCTION OF POLYHYDANTOINS CONTAINING AMIDE GROUPS AND/OR IMIDE GROUPS

[75] Inventors: Friedrich Jonas, Aachen; Rudolf Merten, Leverkusen, both of Fed. Rep. of Germany

[73] Assignee: Bayer Aktiengesellschaft, Leverkusen-Bayerwerk, Fed. Rep. of Germany

[21] Appl. No.: 478,365

[22] Filed: Feb. 12, 1990

[30] Foreign Application Priority Data

Feb. 24, 1989 [DE] Fed. Rep. of Germany ....... 3905791

[51] Int. Cl.$^5$ .............................................. C08G 18/06
[52] U.S. Cl. ....................................... 528/73; 528/48; 528/49; 528/75; 528/80; 525/452
[58] Field of Search ...................... 528/73, 49, 48, 75, 528/80; 525/452

[56] References Cited

U.S. PATENT DOCUMENTS

| | | | |
|---|---|---|---|
| 3,696,153 | 10/1972 | Kershaw | 502/177 |
| 4,269,750 | 5/1981 | Lenwalter et al. | 528/73 |
| 4,284,095 | 7/1981 | Dünwald et al. | 528/49 |
| 4,293,669 | 10/1981 | Rottmaier et al. | 525/452 |
| 4,298,515 | 11/1981 | Lenwalter et al. | 528/73 |
| 4,301,032 | 11/1981 | Atkinson et al. | 252/443 |
| 4,480,051 | 10/1984 | Wu | 562/338 |
| 4,587,228 | 5/1986 | Frank | 502/185 |

FOREIGN PATENT DOCUMENTS 2092016  8/1982  United Kingdom .

*Primary Examiner*—John Kight, III
*Assistant Examiner*—Duc Truong
*Attorney, Agent, or Firm*—Connolly and Hutz

[57] ABSTRACT

Polyhydantoins useful in coating materials, films, adhesives and moldings are prepared by reacting polyfunctional α-aminocarboxylic acids, organic polyiso(thio)cyanates and carboxylic acid compounds in the presence of a condensed aromatic hydrocarbon at a temperature of 0° to 500° C.

17 Claims, No Drawings

PROCESS FOR THE PRODUCTION OF POLYHYDANTOINS CONTAINING AMIDE GROUPS AND/OR IMIDE GROUPS

This invention relates to polyhydantoins based on reaction products of polyfunctional α-aminocarboxylic acid derivatives and organic polyisocyanates, in which the carboxylic acid derivatives described hereinafter are incorporated and in the production of which the condensed aromatic hydrocarbons described hereinafter are used as liquid reaction media.

BACKGROUND OF THE INVENTION

Processes for the production of polyhydantoin plastics by reaction of glycine ester derivatives and polyisocyanates are already known (for example U.S. Pat. No. 3,397,253).

This procedure has since undergone numerous modifications in which the polymers containing hydantoin groups are varied by addition or incorporation of other functional groups, such as amide, imide or ester groups. Many different solvents have been recommended in this regard. Hitherto, however, polymers containing hydantoin groups with the best property level have only been obtained where phenolic solvents, such as phenol, cresols or xylenols, have been used either individually or in admixture.

However, the use of phenolic solvents is accompanied by environmental pollution, so that, where polyhydantoins are applied, for example as wire enamels, from such phenolic solvents, expensive recovery systems are required for the quantitative recovery of these solvents or for their quantitative removal from wastewater and waste air.

DE-OS 28 54 383 describes a process for the production of modified hydantoins in lactones as the reaction medium. However, the polymers obtained on the one hand are yellow in color through secondary reactions and, on the other hand, have a low molecular weight which is reflected in their low relative viscosity.

Wherever polyhydantoins are used as plastics, the phenolic reaction medium has to be quantitatively removed by expensive precipitation and/or extraction processes.

BRIEF DESCRIPTION OF THE INVENTION

It has now surprisingly been found that polyhydantoins containing amide and/or imide groups may be produced with advantage by using condensed aromatic hydrocarbons as the liquid organic reaction medium, which results in the formation of high molecular weight polymers which precipitate during the reaction and may be freed from the reaction medium by simple mechanical separation and washing processes.

DETAILED DESCRIPTION

The present invention relates to a process for the production of polyhydantoins containing amide and/or imide groups based on reaction products of polyfunctional α-aminocarboxylic acid derivatives and organic polyiso(thio)cyanates in liquid organic reaction media, characterized in that the reaction is carried out at 0° to 500° C. using carboxylic acid derivatives corresponding to the following formula

in which

X is a carboxyl group or a cyclic anhydride group from two adjacent carboxyl groups, Y and Z each represent a carboxyl group or, together, represent a cyclic anhydride group from two adjacent carboxyl groups and Z may additionally represent hydrogen where X and Y together cannot form a cyclic anhydride and $R_6$ represents the residue of a linear or branched, aliphatic $C_{2-10}$ hydrocarbon, a cycloaliphatic $C_{5-10}$ hydrocarbon, an aromatic $C_{6-14}$ hydrocarbon or the residue of compounds having the following structure

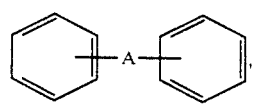

in which

X or Y and Z are each attached to a benzene nucleus and A represents one of the following groups

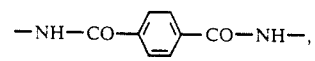

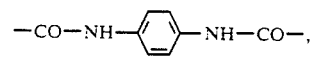

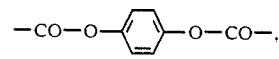

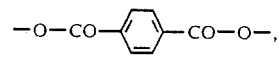

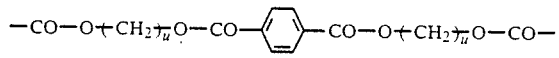

with u = 2-6, $-CO-O+CH_2\rightarrow_{\overline{u}}O-CO-$ with u = 2-6, $-O-$, $-S-$, $-SO_2-$, $-CO-$, $-N=N-$, $-CH_2-$ or $-C(CH_3)_2-$, and in a condensed aromatic hydrocarbon corresponding to the following formula

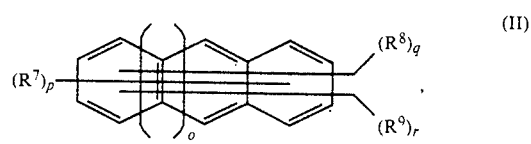

in which $R^7$, $R^8$ and $R^9$ independently of one another represent linear or branched $C_{1-8}$ alkyl or $C_{1-8}$ alkoxy, $C_{5-8}$ cycloalkyl, phenyl, fluorine, chlorine, bromine or nitro, o may assume the value 0 or 1, the value 1 incorporating a linear or annular linkage of the aromatic nuclei, and p, q and r independently of one another assume the values 0, 1, 2 or 3, although their sum is limited to at most 6.

The process according to the invention is preferably carried out using a carboxylic acid derivative corresponding to the following formula

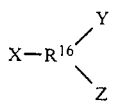
(III)

in which

X, Y and Z are as defined above and $R^{16}$ represents the residue of an aromatic $C_{6-10}$ hydrocarbon or the residue of compounds having the following structure

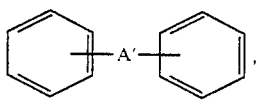

in which

X or Y and Z are each attached to a benzene nucleus and A' represents one of the following groups:

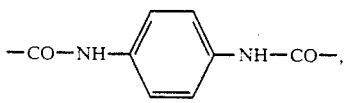

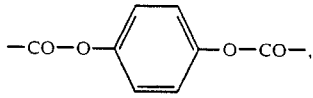

with u = 2-6, —CO—, —C(CH$_3$)$_2$—.

In a particularly preferred embodiment, the carboxylic acid derivatives used are of the type described above in which X is replaced by X' which represents a carboxyl group or a cyclic anhydride group from two adjacent carboxyl groups and Y and Z are replaced by Y' and Z' which, together, represent a cyclic anhydride group from two adjacent carboxyl groups.

In a most particularly preferred embodiment, the carboxylic acid derivatives used have the following structures:

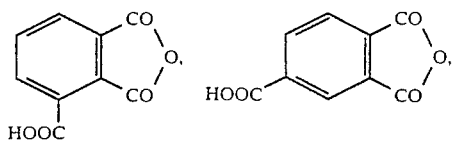

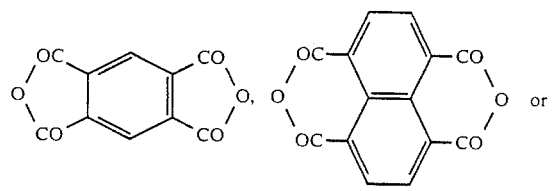

in which A' is as defined above.

Particularly advantageous results are obtained when the carboxylic acid derivatives used have the following structure

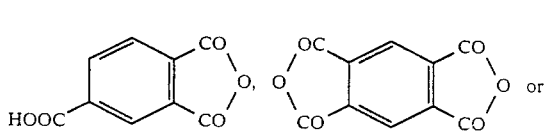

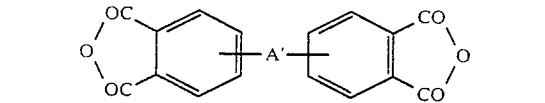

in which A' is as defined above.

Other suitable carboxylic acid derivatives corresponding to formula (I) include those having the following structure:

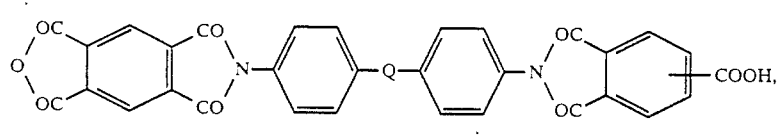

in which

Q may represent structural elements such as —O—, —S—, —SO$_2$—, —CO—, —N=N—, —CH$_2$— or —C(CH$_3$)$_2$—.

Instead of the carboxylic anhydrides mentioned above, it is also possible to use other acid derivatives, for example the corresponding esters or the polycarboxylic acids themselves which react in the same way as the anhydrides during the reaction. Trimellitic anhydride plays a particularly important part. The carboxylic anhydrides may also be replaced in quantities of up to 90 mol-% and preferably in quantities of up to 50 mol-% by other aromatic or aliphatic dicarboxylic acids, such as isophthalic acid, terephthalic acid or adipic acid.

The process according to the invention is preferably carried out in a condensed aromatic hydrocarbon corresponding to the following formula

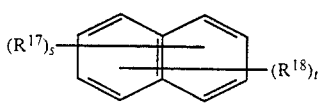
(IV)

in which $R^{17}$ and $R^{18}$ independently of one another represent linear or branched $C_{1-6}$ alkyl or $C_{1-4}$ alkoxy, phenyl or chlorine and s and t independently of one another assume the values 0, 1 or 2, as the liquid organic reaction medium.

A mixture of several of the condensed aromatic hydrocarbons mentioned above may of course also be used as the reaction medium. In particular, it is possible to use mixtures of the type commonly encountered in the chemical field, for example naphthalene distillate cuts.

Condensed aromatic hydrocarbons such as these as the reaction medium are used in a quantity of from 50 to 1,000% by weight, preferably in a quantity of from 60 to 500% by weight and more preferably in a quantity of from 70 to 300% by weight, based on the sum of the weights of the α-aminocarboxylic acid derivatives, the isocyanates and the carboxylic acid derivatives. Up to 40% by weight and preferably up to 30% by weight of the condensed aromatic hydrocarbons or of a mixture of several thereof may be replaced by monocyclic aromatic hydrocarbons, such as toluene, xylenes, ethylbenzene, diethylbenzenes, propylbenzene, isopropylbenzene, chlorotoluene, chloroxylenes and the like.

Examples of condensed aromatic hydrocarbons and derivatives thereof suitable for use in accordance with the invention are naphthalene, anthracene, phenanthrene, 1-methyl naphthalene, 2-methyl naphthalene, diisopropyl naphthalene.

The polyhydantoins containing amide groups and/or imide groups obtainable in accordance with the invention are those based on reaction products of polyfunctional α-aminocarboxylic acid derivatives and organic polyisocyanates. α-Aminocarboxylic acid derivaties for the process according to the invention are those corresponding to the following formula

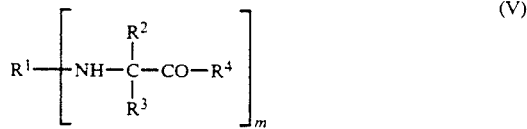

in which $R^1$ is the residue of a linear or branched, aliphatic $C_2$-$C_{20}$ hydrocarbon, a $C_{5-12}$ (alkyl)cycloalkyl hydrocarbon, an aromatic $C_{6-12}$ hydrocarbon, a $C_{7-20}$ aralkyl hydrocarbon, the residue of diphenyl methane, 2,2-diphenyl propane or diphenyl ether or a 5 to 12-membered aromatic or non-aromatic ring containing 1 or 2 heteroatoms from the group consisting of N and/or S and/or O; in the case of polynuclear residues, each of these nuclei may bear at least one of the substituents in square brackets;

$R^2$ and $R^3$ independently of one another represent hydrogen, linear or branched $C_{1-10}$ alkyl, phenyl or benzyl and $R^4$ represents hydroxyl, amino or linear or branched $C_{1-20}$ alkoxy and m is a number of 2 to 4.

Linear or branched aliphatic $C_{2-20}$ hydrocarbons are, for example, ethane, propane, butane, i-butane, the isomeric pentanes, hexanes, octanes, decanes, dodecanes, hexadecanes or eicosanes. $C_{2-10}$ hydrocarbons are preferred and $C_{2-6}$ hydrocarbons particularly preferred.

$C_{5-12}$ (alkyl)cycloalkyl hydrocarbons are, for example, cyclopentane, methyl cyclopentane, cyclohexane, methyl cyclohexane, cycloheptane, cyclooctane and other cycles of the above-mentioned type substituted by one or more lower alkyl radicals and the hydrocarbon on which isophorone is based.

Aromatic $C_{6-12}$ hydrocarbons are, for example, benzene, naphthalene and biphenyl, preferably benzene and naphthalene.

$C_{7-20}$ aralkyl hydrocarbons are, for example, toluene, xylene, trimethylbenzene, ethylbenzene, diethylbenzene, methyl naphthalene, ethyl naphthalene and others; toluene is preferred.

Among the many heterocyclic systems known to the expert, thioxanthene-S-dioxide is preferred.

Linear or branched $C_{1-10}$ alkyl is, for example, methyl, ethyl, propyl, i-propyl, butyl, i-butyl, tert.-butyl, hexyl, octyl or decyl; $C_{1-4}$ alkyl is preferred; methyl and ethyl are particularly preferred.

Linear or branched $C_{1-20}$ alkoxy is, for example, methoxy, ethoxy, propoxy, isopropoxy, butoxy, isobutoxy, tert.-butoxy, amyloxy, hexyloxy, octyloxy, decyloxy, dodecyloxy, hexadecyloxy, eicosyloxy; $C_{1-6}$ alkoxy is preferred; methoxy and ethoxy are particularly preferred.

The substituents mentioned may in turn be mono- or polysubstituted by fluorine, chlorine, bromine, methyl, ethyl, propyl, isopropyl, butyl, isobutyl, methoxy, ethoxy, propoxy, isopropoxy, butoxy, isobutoxy, phenyl, benzyl or phenoxy. Where $R^1$ is aryl and is substituted by phenyl, benzyl or phenoxy or where $R^1$ represents thioxanthene-S-dioxide, the at least disubstitution of $R^1$ indicated by the index m may even occur at various aromatic nuclei.

$R^2$ and $R^3$ may together also form a $C_{4-5}$ alkylene chain, so that, together with the C atom substituted by them, a cyclic system is formed.

Preferred α-aminocarboxylic acid derivatives corresponding to formula (V) are those in which $R^1$ is replaced by $R^{11}$ which emanates from $C_{5-9}$ (alkyl)cycloalkyl hydrocarbon, an aromatic $C_{6-12}$ hydrocarbon or from thioxanthene-S-dioxide.

Other preferred α-aminocarboxylic acid derivatives corresponding to formula (V) are those in which $R^2$ and $R^3$ are replaced by $R^{12}$ and $R^{13}$ which, independently of one another, represent hydrogen or $C_{1-4}$ alkyl.

Other preferred α-aminocarboxylic acid derivatives corresponding to formula (V) are those in which $R^4$ is replaced by $R^{14}$ which represents linear or branched $C_{1-6}$ alkoxy, more preferably methoxy or ethoxy. Other preferred α-aminocarboxylic acid derivatives corresponding to formula (V) are those in which the index m assumes values of 2 or 3 and, more preferably, the value 2.

Basically, the polyfunctional α-aminocarboxylic acid derivatives corresponding to formula (V) may also be replaced on a limited scale by monofunctional derivatives, i.e. derivatives in which the index m assumes the value 1, so that the molecular weight may be adjusted in a manner known in principle to the expert.

The preparation of α-aminocarboxylic acid derivatives such as these is known in principle and may be carried out, for example, by reaction of amines or aminocarboxylic acids with haloacetic acid or derivatives thereof in accordance with the following equation:

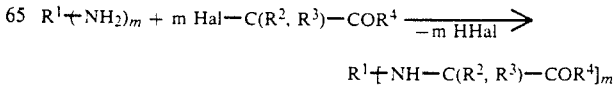

or even by condensation with hydrocyanic acid and aldehydes or ketones with subsequent conversion of the nitrile group into the carboxylic acid group, the ester group or the amide group.

Polyisocyanates for the process according to the invention are those corresponding to the following formula

in which $R^5$ independently of $R^1$ has the same meanings as $R^1$ and n assumes values of 2 to 4.

The substituents $R^5$ as defined may be substituted in the same way as described for $R^1$.

Preferred polyisocyanates are those corresponding to formula (VI) in which $R^5$ is replaced by $R^{15}$ which emanates from linear or branched aliphatic $C_{2-12}$ hydrocarbons, from benzene, from toluene, from naphthalene, from diphenyl methane or from diphenyl ether.

In addition, the index n is preferably replaced by the index n' which may assume the value 2 or 3 and, more preferably, by the index n' with the value 2. Polyisocyanates corresponding to formula (VI) are known from polyurethane chemistry and may be, for example, ethylene diisocyanate, 4-tetramethylene diisocyanate, 1,6-hexamethylene diisocyanate, 1,2,12-dodecane diisocyanate, cyclopentane-1,3-diisocyanate, cyclohexane-1,3- and -1,4-diisocyanate and mixtures of these isomers, 1-isocyanato-3,3,5-trimethyl-5-isocyanatomethyl cyclohexane (isophorone diisocyanate), 2,4- and 2,6-hexahydrotolylene diisocyanate and mixtures of these isomers, hexahydro-1,3- and/or -1,4-phenylene diisocyanate, perhydro-2,4'- and/or -4,4'-diphenyl methane diisocyanate, 1, 3- and 1,4-phenylene diisocyanate, 2,4- and 2,6-tolylene diisocyanate and mixtures of these isomers, diphenyl methane-2,4'- and/or -4,4'-diisocyanate, naphthylene-1, 5-diisocyanate, triphenyl methane-4,4',4"triisocyanate, polyphenyl-polymethylene polyisocyanates of the type obtained by phosgenation of aniline-formaldehyde condensates, perchlorinated aryl polyisocyanates (DE-AS 11 57 601), polyisocyanates containing carbodiimide groups (DE-PS 10 92 007), polyisocyanates containing allophanate groups, polyisocyanates containing isocyanurate groups, polyisocyanates containing urethane groups, polyisocyanates containing acylated urea groups, polyisocyanates containing biuret groups, polyisocyanates produced by telomerization reactions, polyisocyanates containing ester groups and reaction products of such isocyanates with acetals (DE-PS 10 72 358).

It is also possible to use the distillation residues containing isocyanate groups which accumulate in the industrial production of isocyanates, optionally in solution in one or more of the polyisocyanates mentioned above. Mixtures of the polyisocyanates mentioned above may also be used.

It is preferred to use the industrially readily obtainable mixtures of tolylene diisocyanates, m-phenylene diisocyanate and phosgenated condensates of aniline and formaldehyde with a polyphenylene-methylene structure and the symmetrical compounds 4,4'-diisocyanatodiphenyl methane, 4,4'-diisocyanatodiphenyl ether, p-phenylene diisocyanate and 4,4'-diisocyanatodiphenyl dimethyl methane and also isophorone diisocyanate and hexamethylene diisocyanate.

The isocyanates may be used in free form and also partly or completely in the form of their derivatives obtainable by reaction with compounds containing reactive hydrogen; as masked isocyanates, these derivatives release the basic isocyanate again under the reaction conditions.

Masked isocyanates such as these are preferably the adducts of lactams, oximes and CH-acidic compounds and also the carbamic acid esters obtained from aliphatic mono- and polyhydroxy compounds. Masked isocyanates such as these and their production are known from polyurethane chemistry.

Instead of the polyisocyanates mentioned, the analogous polyisothiocyanates may also be used as starting materials.

Polyureas are formed in a first reaction from the α-aminocarboxylic acid derivatives corresponding to formula (V) and the polyisocyanates corresponding to formula (VI); polyhydantoins are formed in a second reaction with elimination of $R^4H$ and cyclocondensation, for example in accordance with the following reaction scheme:

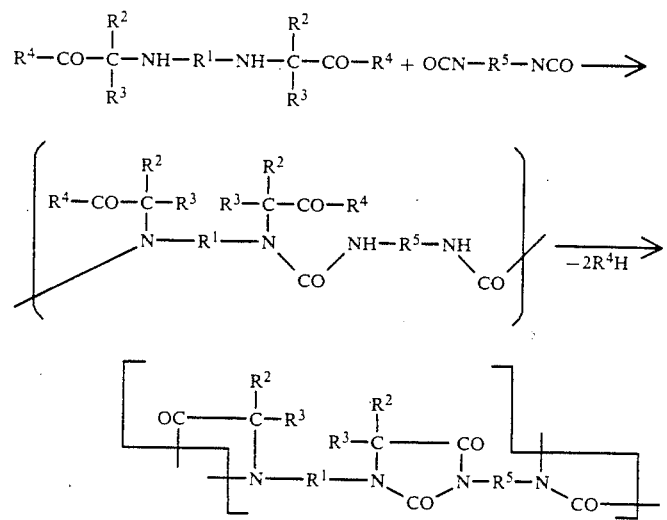

In these formulae, the recurring units of the polyurea appear in the round brackets while the recurring units of the polyhydantoin appear in the broken square brackets.

According to the invention, the polyureas corresponding to the above formula or the polyhydantoins formed therefrom are modified so that they contain amide groups and/or imide groups. To this end, the polyfunctional α-aminocarboxylic acid derivatives are partly replaced by the carboxylic acid derivatives of formula (I) in quantities of from 1 to 99 mol-% and preferably in quantities of from 10 to 90 mol-%. This incorporation of carboxylic acid derivatives instead of α-aminocarboxylic acid ester units between two molecules of the polyisocyanates is illustrated by the following formula scheme with reference by way of example to a carboxylic acid derivative containing a carboxyl group and an anhydride group:

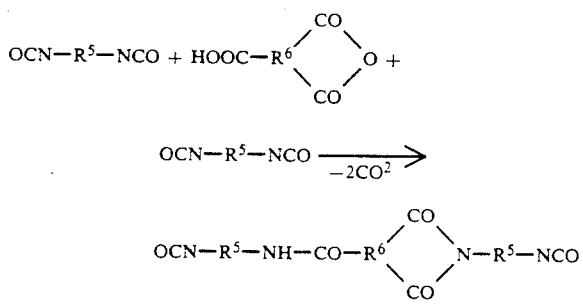

This formula scheme shows both the formation of an amide group and the formation of an imide group in accordance with the invention. Modified polyhydantoins obtainable in accordance with the invention, which contain only amide groups or only imide groups in addition to the hydantoin groups formed from the urea groups, may be produced by using other carboxylic acid derivatives corresponding to formula (I) as described above. In general, modified polyhydantoins obtainable in accordance with the invention containing both amide groups and imide groups will be produced.

Where both indices m and n assume the value 2, linear products are obtained. Where one of the indices assumes a higher value branched products are obtained. Where a mixture of different compounds of formula (V) having different functionalities (a mixture of bis-glycine derivative with m=2 and tris-glycine derivative with m=3 or even higher) are used, a broken index is obtained instead of a whole index for the index m as an average of the overall use of the material of formula (V). The same can apply to polyisocyanates corresponding to formula (VI). If, now, both indices m and n are raised beyond the value 2 at the same time, a cross-linked product is formed very easily from the branched product during the actual production reaction. In terms of industrial operation, this is inappropriate and therefore undesirable. Accordingly, one of the indices m and n will preferably always assume the value 2.

The process according to the invention is generally carried out by initially introducing the polyfunctional α-aminocarboxylic acid derivative and the carboxylic acid derivative of formula (I) to be incorporated in a condensed aromatic hydrocarbon corresponding to formula (II) as the liquid reaction medium, adding the polyiso(thio)cyanate and heating the reaction mixture for a relatively long time. The total quantity of polyfunctional α-aminocarboxylic acid derivative and the carboxylic acid derivative of formula (I) to be incorporated may be selected so that 0.5 to 10 equivalents iso(thio)cyanate groups and preferably 1 to 2 equivalents are reacted per equivalent reactive carboxylic acid, carboxylic acid derivative or anhydride group. The reaction with isocyanate is followed by the formation of the hydantoin rings at a relatively high temperature, as known to the expert.

The reaction temperatures for the process as a whole are in the range from 0° to 500° C. and preferably in the range from 20° to 300° C. The initial reaction to urea, amide or imide groups is carried out in the lower part of this temperature range, for example at 0° to 80° C. and preferably at 20° to 50° C., while the cyclization to the hydantoin groups is carried out at 80° to 500° C. and preferably at 80° to 300° C.

Basically, the process according to the invention is not critical in regard to the pressure to be applied. Accordingly, it is preferably carried out under normal pressure. A slightly elevated pressure may be appropriate when low-boiling mixture components, such as toluene or xylene or the like, are used in addition to the condensed aromatic hydrocarbon (II).

The cyclization to the hydantoin groups may be accelerated by known catalysts, for example metal alcoholates, tertiary amines and others.

The polymers formed accumulate as solids in the course of the polymer reaction and may be freed from the condensed aromatic hydrocarbons as reaction medium by simple mechanical separation and subsequent washing processes. This was unexpected because caking on the walls of the reaction vessel or on the stirrer had been expected to occur with the attendant adverse effects on adequate temperature control.

Other polymers, such as polyesters, polyamides, polyurethanes, polyolefins, polyacetals, polyepoxides, polyimides, polyamide imides, polyiminopolyesters, polyimide isocyanates, may also be added or incorporated in the polymer in the course of the process according to the invention. However, other polymers such as these may also be subsequently used as blending constituents for the modified polyhydantoins obtainable in accordance with the invention.

The modified polyhydantoins obtained by the process according to the invention are heat-resistant plastics which have excellent mechanical properties. They may contain any of the additives typically used for plastics, such as fillers, pigments, antioxidants, plasticizers, etc.

The modified polyhydantoins obtainable in accordance with the invention are free from environmentally and physiologically harmful solvents and are therefore eminently suitable for use as thermoplastics, cast films or stoving enamels which satisfy more recent ecological requirements.

EXAMPLE 1

28.08 g 4,4'-diisocyanatodiphenyl methane were added to a mixture of 1.92 g trimellitic anhydride. 60 g 2-methyl naphthalene, 20 g toluene and 39.85 g N,N'-bis-(2-carbomethoxy)-4,4'-diaminodiphenyl methane, followed by stirring for 12 hours at 40° C. After the addition of 0.85 anilinoi-butyric acid methyl ester, 0.1 g triethylenediamine and 30 g 2-methyl naphthalene, the reaction mixture was condensed for 6 hours at 210° C. The suspension formed was filtered under suction and washed with toluene. 60 g of a colorless polymer powder were obtained after drying, showing the bands typical of a hydantoin in the IR spectrum.

Determination of the relative viscosity produced a value of 2.23 (1% in m-cresol/25° C.); the glass transition temperature was 244° C.

To produce a cast film, 15 parts by weight of the polymer were dissolved in 85 parts by weight methylene chloride and, after the removal of air, the resulting solution was cast onto a glass plate to form a film. Evaporation of the solvent and drying at 160° C. left a colorless, clear film.

EXAMPLES 2 and 3

The following reaction mixtures were converted into polyhydantoins in the same way as in Example 1:
Reaction mixture for Example 2:
1.92 g trimellitic anhydride
39.85 g N,N'-bis-(2-carbomethoxypropyl)-4,4'-diaminodiphenyl methane
0.85 g anilino-i-butyric acid methyl ester
0.1 g triethylenediamine
28.08 g 4,4'-diisocyanatodiphenyl methane
150 g naphthalene
30 g toluene.

The polymer suspension obtained on completion of the reaction was diluted with 100 g toluene and then filtered under suction. The polymer had the following characteristics:
Rel. viscosity 37.7: 2.05 1% in m-cresol/25° C.
Glass transition temperature: 254° C.
Reaction mixture for Example 3:
1.92 g trimellitic anhydride
39.85 g N,N'-bis-(2-carbomethoxypropyl)-4,4'-diaminodiphenyl methane
0.85 g anilino-i-butyric acid methyl ester
0.1 g triethylenediamine
28.08 g 4,4'-diisocyanatodiphenyl methane
120 g diisopropyl naphthalene
30 g toluene.

52.4 g of a colorless polymer having the following characteristics were obtained:
Rel viscosity (1% in cresol/25° C.): 1.85
Glass transition temperature: 251° C.

EXAMPLE 4 (for comparison)

28.08 g 4,4'-diisocyanatodiphenyl methane were added to a mixture of 1.92 g trimellitic anhydride, 60 g diethylbenzene (isomer mixture) and 39.85 g N,N'-bis-(2-carbomethoxypropyl)-4,4'-diaminodiphenyl methane, followed by stirring for 12 hours at 40° C. After the addition of 0.85 g anilino-i-butyric acid methyl ester and 0.1 g triethylenediamine, the mixture was cyclocondensed for 6 hours at 200° C. A dark brown, crosslinked mass which could no longer be stirred was formed during this reaction. The bands typical of the hydantoin group were only vaguely discernible in the IR spectrum. The production of a cast film was not possible because the polymer was insoluble in the usual solvents.

EXAMPLE 5 (for comparison)

28.08 g 4,4'-diisocyanatodiphenyl methane were added to a mixture of 1.92 g trimellitic anhydride, 60 g γ-butyrolactone and 39.85 g N,N'-bis-(2-carbomethoxypropyl)4,4'-diaminodiphenyl methane, followed by stirring for 12 hours at 40° C. After the addition of 0.85 g anilino-ibutyric acid methyl ester and 0.1 g triethylenediamine, the reaction mixture was cyclocondensed for 6 hours at 210° C. 122.8 g of a brown, highly viscous solution were obtained, diluted with 300 ml methylene chloride and added dropwise to 2.5 l methanol. Filtration under suction and drying left 61 g of a light brown polymer powder having the following characteristics:
Rel. viscosity (1% in m-cresol/25° C.): 1.84
Glass transition temperature: 234° C.

A cast film produced in the same way as in Example 1 was deep yellow in color.

What is claimed is:

1. In an improved process for the production of polyhydantoins containing amide moieties, imide moieties, or both, by reacting polyfunctional α-aminocarboxylic acid reactants and organic polyiso(thio)cyanates in liquid organic reaction media,
the improvement comprises carrying out the reaction at 0 to 500° C. with an additional carboxylic acid compound of the formula

in which

X is a carboxyl or a cyclic carboxylic anhydride moiety,

Y and Z each represent a carboxyl or together represent a cyclic carboxylic anhydride moiety, Z also represents hydrogen where X and Y together cannot form a cyclic carboxylic anhydride, and $R^6$ represents a linear or branched, aliphatic $C_{2-10}$ hydrocarbon, a cycloaliphatic $C_{5-10}$ hydrocarbon, an aromatic $C_{6-14}$ hydrocarbon or a moiety having the structure

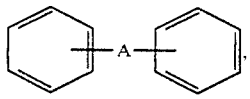

in which X, Y and Z are each attached to a benzene nucleus and

A represents

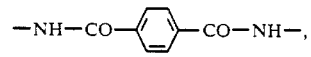

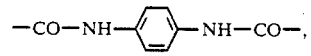

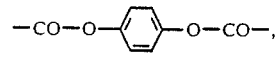

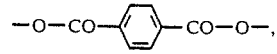

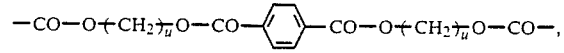

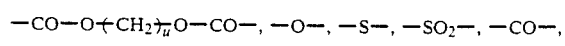

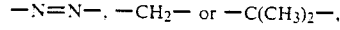

wherein u is a value from 2 to 6;
and carrying out the reaction in the presence of a condensed aromatic hydrocarbon corresponding to the formula (II)

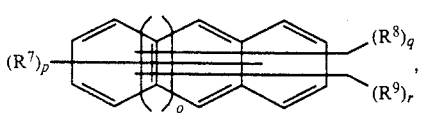 (II)

in which
- R$^7$, R$^8$ and R$^9$, independently of one another, each represent linear or branched C$_{1-8}$ alkyl, C$_{1-8}$ alkoxy, C$_{5-8}$ cycloalkyl, phenyl, fluoro, chloro, bromo or nitro,
- o has the value 0 or 1 with the value 1 meaning incorporating a linear or annular linkage of aromatic nuclei, and
- p, q and r, independently of one another, each have the value 0, 1, 2 or 3, with the proviso that the sum of the values of p, q and r is as most 6.

2. A process as claimed in claim 1 wherein Y and Z of the carboxylic acid compound together represent a cyclic carboxylic anhydride.

3. A process as claimed in claim 1 wherein R$^6$ of the carboxylic acid compound represents an aromatic C$_6$-hydrocarbon or the structure

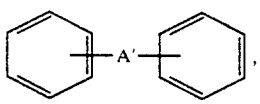

in which
A' represents

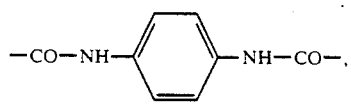

—CO—O—(CH$_2$)$_u$—O—CO—, —CO—, or —C(CH$_3$)$_2$—, wherein u is a value from 2 to 6.

4. A process as claimed in claim 3 wherein Y and Z of the carboxylic acid compound together represent a cyclic carboxylic anhydride.

5. A process as claimed in claim 1 wherein the carboxylic acid compound has the structure

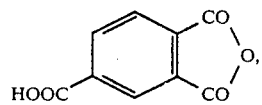

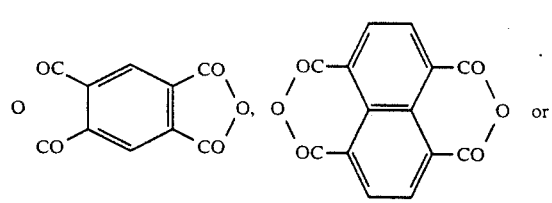

-continued

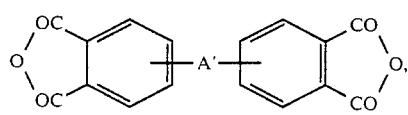

wherein A' represents

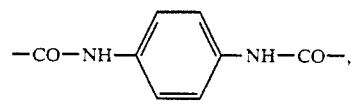

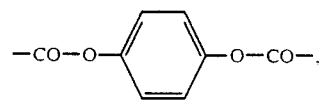

—CO—O—(CH$_2$)$_u$—O—CO—, —CO—, or —C(CH$_3$)$_2$—.

6. A process as claimed in claim 5 wherein the carboxylic acid compound is

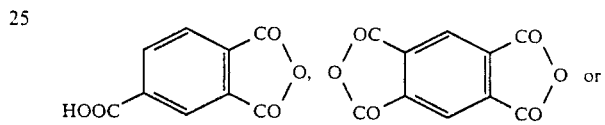

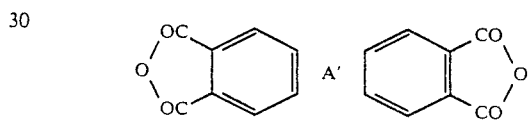

7. A process as claimed in claim 1 wherein the carboxylic acid compound replaces from 1 to 99 mol-% of the α-aminocarboxylic acid reactant.

8. A process as claimed in claim 1 wherein the carboxylic acid compound replaces from 10 to 90 mol-% of the α-aminocarboxylic acid reactant.

9. A process as claimed in claim 1 in which said condensed aromatic hydrocarbon in the presence of which the reaction is carried out has the formula

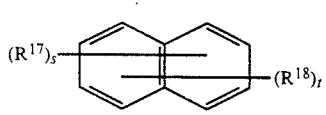

in which
- R$^{17}$ and R$^{18}$, independently of one another, each represent linear or branched C$_{1-6}$ alkyl, C$_{1-4}$ alkoxy, phenyl or chloro and
- s and t, independently of one another, each have the values 0, 1 or 2.

10. A process as claimed in claim 1 in which said condensed aromatic hydrocarbon comprises a mixture of at least two compounds corresponding to formula (II).

11. A process as claimed in claim 1 wherein the amount of the condensed aromatic hydrocarbon is from 50 to 1,000% by weight, based on the sum of the weights of the α-aminocarboxylic acid reactant, isocyanates and carboxylic acid compounds.

12. A process as claimed in claim 11 wherein the amount of the condensed aromatic hydrocarbon is from 60 to 500% by weight.

13. A process as claimed in claim 11 wherein the amount of the condensed aromatic hydrocarbon is from 70 to 300% by weight.

14. A process as claimed in claim 1 wherein the condensed aromatic hydrocarbon of formula (II) is napthalene, anthracene, phenanthrene, 1-methyl naphthalene, 2-methyl naphthalene or diisopropyl naphthalene.

15. A process as claimed in claim 1 wherein the condensed aromatic hydrocarbon of formula (II) is 2-methyl naphthalene.

16. A process as claimed in claim 1 wherein the condensed aromatic hydrocarbon of formula (II) is naphthalene.

17. A process as claimed in claim 1 wherein the condensed aromatic hydrocarbon of formula (II) is diisopropyl naphthalene.

* * * * *